Sept. 26, 1933.    W. H. SMITH    1,928,140
METHOD OF REDUCING METALLIC OXIDES
Filed Oct. 22, 1929    3 Sheets-Sheet 1
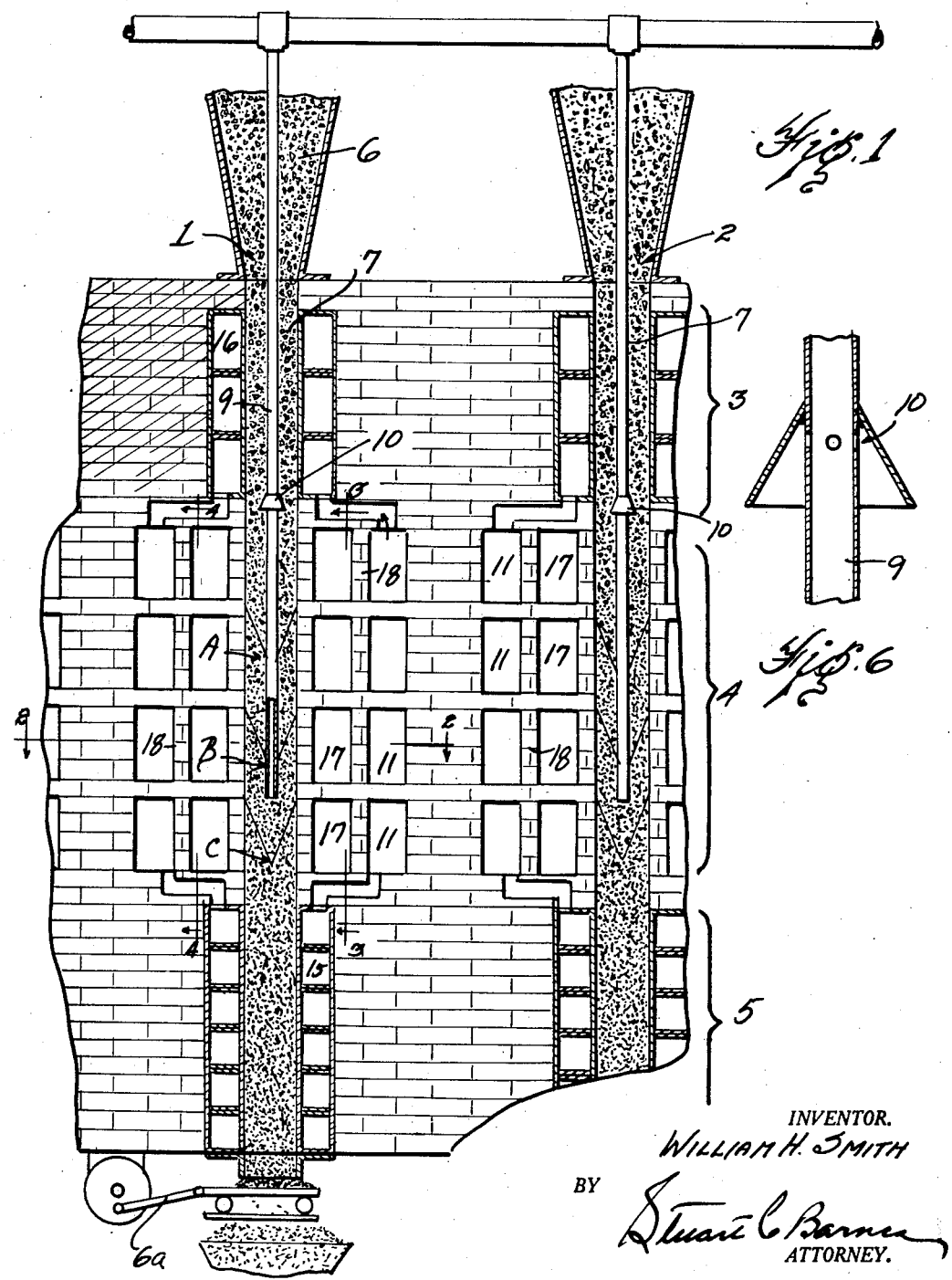
INVENTOR.
WILLIAM H. SMITH
BY
ATTORNEY.

Sept. 26, 1933.  W. H. SMITH  1,928,140
METHOD OF REDUCING METALLIC OXIDES
Filed Oct. 22, 1929   3 Sheets-Sheet 2
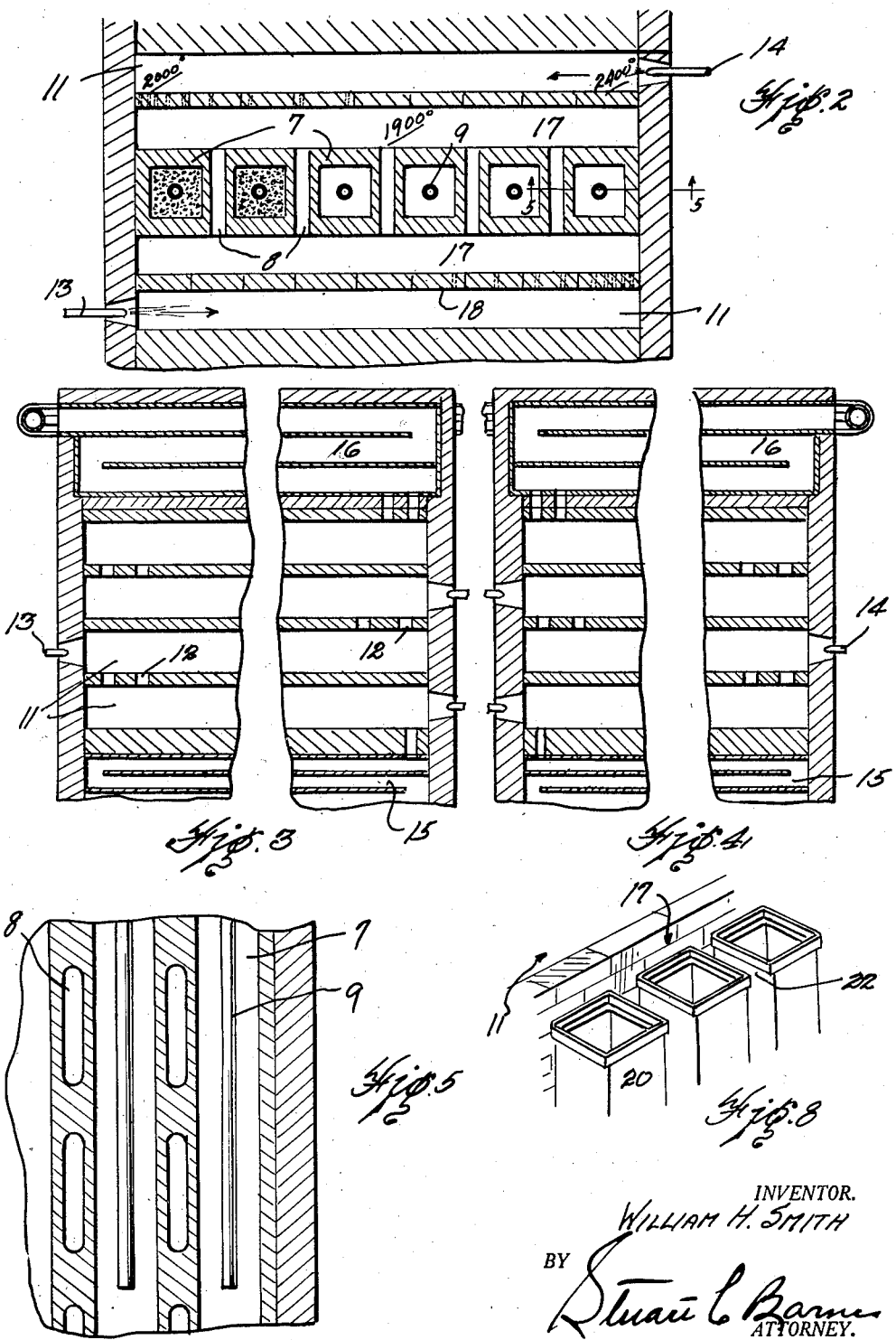

Sept. 26, 1933.                 W. H. SMITH                 1,928,140
               METHOD OF REDUCING METALLIC OXIDES
                      Filed Oct. 22, 1929          3 Sheets-Sheet 3

INVENTOR.
WILLIAM H. SMITH
BY
ATTORNEY.

Patented Sept. 26, 1933

1,928,140

UNITED STATES PATENT OFFICE 1,928,140

METHOD OF REDUCING METALLIC OXIDES

William H. Smith, Detroit, Mich., assignor to General Reduction Corporation, Detroit, Mich., a corporation of Delaware Application October 22, 1929. Serial No. 401,606

4 Claims. (Cl. 75—14)

This invention relates to a method of reducing metallic oxides, and has to do particularly with an improved method and structure for controlling the application of heat to the ore so as to reduce the same without melting.

Heretofore, in the art of reducing iron ore without melting, many different types of retorts have been designed in an attempt to reduce such ore, and in my Patents No. 1,692,587 November 20, 1928, and No. 1,692,588, November 20, 1928, I have described an apparatus and method for reducing metallic oxides by completely enclosing and continuously moving thin streams of ore through successive zones whereby to effect reduction. Efficient reduction has been obtained by furnaces such as disclosed in said patents, such efficiency pertaining both to the quality of the ore obtained and to the minimum number of heat units required.

In commercial and practical operation of the ovens and method described in said patents, I have found that they present difficulties in reducing iron ore when the source of heat in the reduction zone is from means greater than 2000° F. Furthermore, the ovens, as described in said patents, regardless of what source of heat supply are limited in size because of the direct heat contact between the combustion or heating chambers and the retort. The correct reduction range is quite limited, and may be given at about 1400° F. to 1900° F. The temperature limit of above 1900° F. obviously limits the heat supply available in said old form.

It is the object of the present invention to supply an unlimited amount of heat units, at reducing temperature, from sources of heat or combustion which are necessarily of a higher temperature than the reducing temperature, thereby permitting an increased rate of reduction and increased speed of movement of the reduced material through the retort. In other words, the gist of the present invention resides in the supplying and applying of unlimited quantities of heat at the correct reducing temperature.

This result is accomplished in one manner by continuously feeding streams of ore in general relatively thin parallel spaced streams, but with each general stream of ore broken up into a plurality of individual and longitudinally spaced streams or retorts whereby the source of external heat is spaced from the retorts so as to form equalizing and storage chambers whereby each individual retort is positioned in what might be termed a sea of heat, within the proper reducing ranges.

A further feature of the invention resides in the manner of arranging the combustion chamber in the reducing zone and the manner of forming the novel equalizing and storage chambers between the combustion chambers and the longitudinally spaced retorts.

A still further feature of the invention resides in the method of taking off the gases formed during the reducing reaction, the positioning of the take-off pipes for the gases being such as to materially assist in the conduction of heat units, which completely surround each small retort, toward the center thereof so as to heat the interior of the continuously moving stream of ore. Still other features reside in the details of construction of the oven structure and manner of arranging the various parts thereof as will be more clearly brought out in the specification and claims.

In the drawings:

Fig. 1 is a vertical cross sectional view taken through a pair of adjacent units constructed in accordance with the present invention.

Fig. 2 is a horizontal cross section taken on line 2—2 of Fig. 1, and illustrating in particular the preferred manner of constructing and arranging the combustion chamber, the equalizing chambers, and the spaced retorts.

Fig. 3 is a vertical sectional view taken on line 3—3 of Fig. 1, and showing the manner of spacing the burner on one side of the retorts.

Fig. 4 is a similar sectional view taken on line 4—4 of Fig. 1, and showing the relative positioning of the burner on the opposite side of the retorts.

Fig. 5 is a sectional view taken on line 5—5 of Fig. 2 showing the manner of positioning the gas outlet pipes and the formation of the cross spacing between the spaced retorts.

Fig. 6 is an enlarged sectional detail view of a portion of the gas outlet pipe showing the manner of taking off gases at any desired predetermined point.

Fig. 7 is a longitudinal sectional view similar to Fig. 1, but illustrating a modified manner of constructing the reducing retorts.

Fig. 8 is a fragmentary perspective view illustrating one form of arranging the retorts according to the construction shown in Fig. 7.

Fig. 9 is a vertical sectional view of a unit embodying the process set forth in Figs. 1 to 8 but constructed to greatly increase the rate of reduction of the continuously moving ore.

One of the most important problems in the reduction of iron ore without melting is the provision of suitable fixed zones through which the ore must pass, and the manner and number of heat units to be supplied at the various zones. The present invention is directed mainly to the structure of the reducing zone and the manner of controlling the application of heat in such zone.

As set forth in said prior patents, I preferably provide a series of units, which may be termed a bank of units, and in Fig. 1 I have shown two of such reducing units in detail and broadly designated 1 and 2. Each unit preferably consists of a preheating zone 3, a reducing zone 4, and a cooling zone 5, and in the illustrated embodiment each unit or retort is vertical in that the feeding hoppers 6, the entire length of the retort, and the discharge member 6a are in vertical alignment. The feeding hoppers 6 are preferably open, as shown, because the device being continuous and being capable of reducing very fine ore will thus keep the mouth of each retort closed at all temperatures to prevent the escape of gases.

As set forth in my copending application 322,378 filed November 28, 1928 it has been found that efficient reduction of metallic oxides, and particularly iron ore, is best accomplished by providing distinct zones in the general reduction zone which distinct zones are maintained at a constant predetermined temperature. I have indicated such zones as being three in number, the first zone being designated A, the second zone B, and the final zone C.

The temperature maintained in each particular zone may vary considerably as well as the amount of heat units applied to each zone, but in the reduction of iron ore I have found that the preferred temperature for reducing $Fe_2O_3$ to $Fe_3O_4$ in the first zone is up to 500° C., in the presence of a suitable reducing agent which may be an ascending carbonaceous or hydrogen gas from the two lower zones. The preferred temperature for reducing $Fe_3O_4$ to $FeO$ in the zone B is from 500° to 700° C. largely utilizing the ascending gases from zone C which are preferably at a predetermined ratio varying from approximately 30% CO and 70% $CO_2$ to 60% CO and 40% $CO_2$. In zone C the preferred maintained temperature varies between 700° C. and 1100° C. and the CO to $CO_2$ ratio from approximately 60% CO to approximately 95% CO. The supply of heat units in the case of iron ore reduction is preferably in the ratio of substantially 60% to zone C, in carrying out the final reduction; approximately 22% to zone A; and approximately 18% to B. The above details are not particularly important in connection with the invention claimed herein, but are believed to assist in an understanding of the same.

To obtain substantially complete reduction of the metallic oxides in the reducing zone, it will be advantageous to obtain substantially the same temperature throughout the materials being reduced at the successive zones; or, in other words, the penetration of heat should be substantially the same at the center of each stream of ore as at the outer edge.

A retort of long and narrow rectangular shape will substantially solve this problem, particularly where a rather coarse ore and reducing agent is used, as in that case the small gas pockets formed between the particles of ore will permit the conduction of heat units throughout the mass whereby to substantially evenly heat the same. In order to obtain substantially the same results in the reduction of fine ores, I have divided each spaced main unit 1 and 2, etc., into a plurality of longitudinally spaced retorts 7, as best shown in Fig. 2. Each retort 7 is substantially rectangular in shape and separated by the gas spaces 8 whereby the retorts when taken together, as shown in Fig. 2, will provide a reducing unit or a general retort of long and narrow cross section.

By dividing each general retort into a plurality of small retorts, it will be obvious that I have not only retained the benefit of a long thin stream of ore but also have divided this long thin stream into a plurality of separate streams whereby to permit the heat units to pass therebetween and thus assist in heating the center of the continuously moving streams of ore. In addition to passing the heat units through the general stream of ore, I have also inserted in each retort 7 a gas eduction pipe or flue 9. Such flues being preferably metal and being filled with rising gases, it will be obvious that the heat units will be drawn towards the center of each retort.

Each flue 9 preferably extends downwardly in each retort, as best shown in Fig. 1, to a point just above the final reducing zone, and at predetermined points above the bottom of each pipe or flue I preferably add other take-off apertures 10 for removing gases at predetermined points, as they are formed. An enlarged detail of one form of constructing such take-off points is illustrated in Fig. 6. It will be understood that due to the different permanent temperature zones and in the use of different oxides and reducing material, that various gases will be formed at different points in the retort, and it may in some cases be even desirable to continue the pipe on down through the reducing zone.

The heat units for effecting reduction may be supplied from various sources, and in the present embodiment I have shown such heat units as being supplied from suitable burners. Starting with the construction of the reducing zone, I have provided a series of longitudinally extending and vertically spaced combustion chambers 11, each chamber being connected at opposite ends as at 12 so as to form a tortuous passageway for the products of combustion.

The burners at each zone level are oppositely spaced as, for instance, in Fig. 2 the burner 13 is positioned at one end of the combustion chamber 11 and a similar burner 14 is positioned at the other end of a similar combustion chamber on the opposite side of the reducing unit or retort. This arrangement is also shown in Figs. 3 and 4.

The vertically spaced and connected passageways 11 are connected at the lower end with a series of tortuously arranged cooling flues 15 and at the upper end to a series of vertically arranged preheating flues 16, as shown in Figs. 1, 3 and 4. The preheating flues are preferably connected at the top to a suitable exhaust flue which may be controlled in order to regulate the upward movement of the heating gases in the passageways defining the reduction zone as well as the passageways defining the preheating zone.

By positioning the burner units on each side of the reducing retort, as shown in Fig. 2, it will be obvious that the temperature will be, in a measure, balanced for that particular zone or level. For instance, the temperature at the entrance end of one burner might be around 2400° F. and at the opposite end of this flue drop to around 2000° F. The burner on the opposite side of the retorts will, of course, be arranged to give just exactly the opposite results, with the result that the temperature throughout the length of the retorts will be substantially constant. However, to more positively obtain an equalization of the temperatures throughout the length of the retorts, at a given level, I have provided a series of vertically spaced equalizing or storage chambers 17, which, as best shown in Figs. 1 and 2, are positioned between each vertically spaced combustion chamber or flue 11 and the longitudinal series of retorts 7.

The equalizing chambers 17 are obviously interconnected by means of the cross passageways 8, whereby the temperature surrounding the retorts 7 is substantially the same and predetermined for a given level or levels as desired. In other words, as shown in Fig. 1, to maintain the temperature of the retorts at the level of the zone C the oppositely positioned burners in the end of the combustion chambers 11 will create a certain temperature in such chambers 11 which temperature will be balanced and equalized throughout the length of the retorts in zone C by means of the interposed equalizing chambers 17.

Each equalizing chamber 17 may be separate from its adjacent flue or combustion chamber 11, but as shown in Fig. 2, I preferably provide a small amount of openwork at one end of the partition which separates the adjacent chambers 11 and 17. The porosity of this openwork preferably increases towards the end of the partition, or the same result might be obtained by decreasing the thickness of the partition at the end farthest away from the burner with the result that as the temperature of the flame from the burner 13 decreases the thickness of the partition will also decrease with the result that the transmission of heat units through the partition will be easier and thus tend to maintain an even temperature in the equalizing or storage chamber. It will also be understood that the retorts themselves may be slightly porous and the walls 18 sealed from the combustion chambers. Whether the walls 18 or the walls of the retort 7 are porous depends upon whether or not a solid or gaseous reducing agent is used, as in one case the products of combustion may pass into the storage or equalizing chamber and in the other case the gases from the retorts pass from the retorts to the storage chambers or vice versa, in which case reducing gases may be introduced through the storage chambers.

Thus, instead of using the partition walls 18 to separate the moving material within the retort and the blast of flame in the combustion flues, I have provided balancing and equalizing chambers around and between the various retorts 7 making up the general relatively long and narrow reducing units. In this manner, I am able to obtain a relatively high reducing temperature within the center of the column or stream without maintaining too high a temperature adjacent the outer surface of such column or stream of ore. In other words, with relation to the reduction of iron ore, I can maintain a constant temperature of 1900° F. in the equalizing chambers surrounding the reducing zone C which will result in a temperature of substantially 1700° F. in the center of each column or stream of ore and at the same time maintain an endothermic reducing reaction in reducing FeO to Fe. This eliminates all tendency of the reduced iron to adhere to the walls of the retorts which would take place at temperatures above 1900° F. and thus insures a continuously moving free stream of material in each retort.

In Figs. 7 and 8 I have shown a slightly modified form of structure in that the individual retorts are made up of a series of interconnected flues or units 20 which are joined by means of a suitable joint as at 21. In this case the equalizing chambers 17 are constructed in substantially the same manner, as shown in Fig. 1, but the walls of the pipe units 20 form the partitions between the equalizing chambers and the continuously moving streams of ore.

Also in this construction a rather large passageway 22 is formed between the equalizing chambers 17 with the result that all of the vertically spaced equalizing chambers may be in communication if desired. The pipes 20 may be of metallic construction or of ceramic construction. By using storage or equalizing chambers at the temperatures stated, it will be seen that the retort walls may be of metal construction throughout the entire height of each individual retort.

In the embodiment illustrated in Fig. 9 I have shown one unit of my novel structure as being of relatively great height, the preheating zone being designated 23, the reducing zone 24, and the cooling zone 25. It is not only important to accurately control and maintain temperatures at any given zone, but it is also an important factor to supply sufficient heat units at the point or points required. By increasing the surface area of the retort in the preheating zone and the reducing zone, in addition to having an unlimited supply of heat units in the storage chamber, it will be obvious that I am able to supply a greater number of heat units, as desired, and hence am able to increase the rate of reduction and consequently the flow of material through each retort.

In order to accomplish this materially increased rate of reduction and flow, the unit shown in Fig. 9 is provided with a series of interconnecting units 20, similar to the units shown in Figs. 7 and 8, such units being longitudinally arranged similar to the arrangement shown in Fig. 2. The equalizing chambers 17 are positioned on each side of each row of pipes 20 and suitable combustion or heating chambers 11 are positioned alongside each equalizing chamber similar to the arrangement shown in Figs. 1, 2, and 7.

The burners in the combustion chambers in each vertically spaced zone are arranged oppositely as best shown in Fig. 2 and, of course, each set of burners in each combustion chamber may be independently regulated to accurately control the temperature at different points along the height of the reduction zone and it will also control the heat units applied at any desired points.

Due to the dividing up of each longitudinal stream of ore into a plurality of streams and the provision of an equalizing or storage chamber around the small retorts, it will be seen that by greatly increasing the surface area in the reduction zone and the provision of closer graduations in such reduction zone, I am able to supply an increased amount of heat to satisfy the endothermic action in the reduction zone thereby materially increasing the rate of movement of the materials through the retorts and by increasing the height of the retorts, in combination with the storage chambers, I am practically unlimited in reduction speed and in the speed of movement of the ore.

This increased rate of movement obviously means a greatly increased supply of heat units and this must be counteracted by a greater absorption of sensible heat in the cooling zone. To take care of this I have provided an initial cooling zone 26 which is preferably supplied with liquid and liquid vapors whereby to quickly reduce the temperature of the reduced ore from around 1700° to 400° F., and a second cooling zone 27 wherein the cooling medium is preferably cooled air which may be utilized in the combustion chambers after having absorbed heat from the moving stream of reduced ore and having cooled the same from approximately 400° to 100° Fahrenheit.

The top of the retort in Fig. 9 is preferably left open because the relatively fine ore and reducing agent used is sufficient to continuously seal the retort. The bottom of the retort is preferably provided with a suitable slide 28 similar to the slides of the retorts 7 for intermittently permitting discharge of the reduced ore without the admission of air to the retort. The unit shown in Fig. 9 is not shown as provided with the gas eduction flue, as it will be understood that such flue is not necessary to a practical operation of the unit. It will be understood that the flue 9 shown in Fig. 7 may, if desired, be utilized for introducing a gaseous reducing agent instead of taking off the gases formed by the reaction.

It will be understood that my novel equalizing and storage chamber is equally useful in both small and large units and for reducing any kind or grade of ore; the function in each case is the same, but the unlimited sea of fixed heat temperature provided by said storage chambers is particularly useful in the operation of a large unit. It will further be obvious that the speed of movement of the ore is substantially unlimited, as regardless of the heat units required, proportionate to the rate of reduction, such heat units will always be available without raising the temperature of the walls of the retort to too high a degree.

It will further be understood that as far as the method of heat transfer is concerned the walls of the retorts for conducting and enclosing the ore may be substantially of any construction desired, said ore being enclosed by the ceramic walls as shown in Fig. 1, the metallic walls or pipes as shown in Fig. 8, or even in metallic boxes which may be passed through the equalizing chamber or chambers.

What I claim is:

1. The method of reducing iron ore or similar metallic oxides without melting, which consists in continuously passing the ore and its reducing agent through a reducing zone of fixed temperature, substantially surrounding the continuously moving stream of ore in the reducing zone and maintaining said fixed temperature by a combustion chamber or chambers, and modifying said fixed combustion temperature but still maintaining a uniform temperature at said zone by interposing an equalizing zone between the combustion chamber or chambers and the stream of ore.

2. The method of reducing relatively fine iron ore or similar metallic oxides, which consists in feeding the fine ore and its reducing agent, in a plurality of relatively small retorts spaced from each other to form a general relatively long and narrow continuously moving stream of ore, passing said stream of ore through a reducing zone of fixed temperature maintained by regulable combustion means and modifying the direct combustion heat units but still maintaining the temperature around all of said separate streams of ore uniform at said reducing zone.

3. The method of reducing iron ore or similar metallic oxides, which consists in continuously moving the ore and its reducing medium in a relatively thin stream, establishing a fixed reducing zone at a predetermined point in the path of movement of said ore, creating by combustion a continuous supply of heat units at said fixed temperature zone and equalizing the actual reducing temperature existing around the continuously moving thin stream of ore at such reducing zone by spacing said combustion heat creating means a material distance from the continuously moving stream of ore, and dividing said continuously moving thin stream of ore into a plurality of separate streams of ore in passing through said fixed reducing zone, whereby an excess of heat units at the reducing temperature required may be maintained in the fixed reducing zone and in the space between the ore and the heat creating means, and will completely surround the separated streams of ore of the general thin stream of ore.

4. The method of reducing iron ore or similar metallic oxides without melting, which consists in continuously feeding the ore in a relatively thin stream, dividing this thin stream into a plurality of longitudinally spaced streams, passing said streams through a reducing zone maintained by combustion chambers, controlling the heat units supplied to said reducing zone, and regulating the rate of reduction of the ore and rate of movement through the reducing zone in accordance with the effective surface area of the reducing zone and the amount of heat units supplied thereto and equalizing the temperature adjacent the moving streams of ore against any increase in temperature in the combustion chambers by maintaining a gaseous envelope around the spaced streams of ore.

WILLIAM H. SMITH.